L. BOUCHER.
WHEEL BRAKE FOR DUMP WAGONS.
APPLICATION FILED AUG. 3, 1907.
927,322.
Patented July 6, 1909.
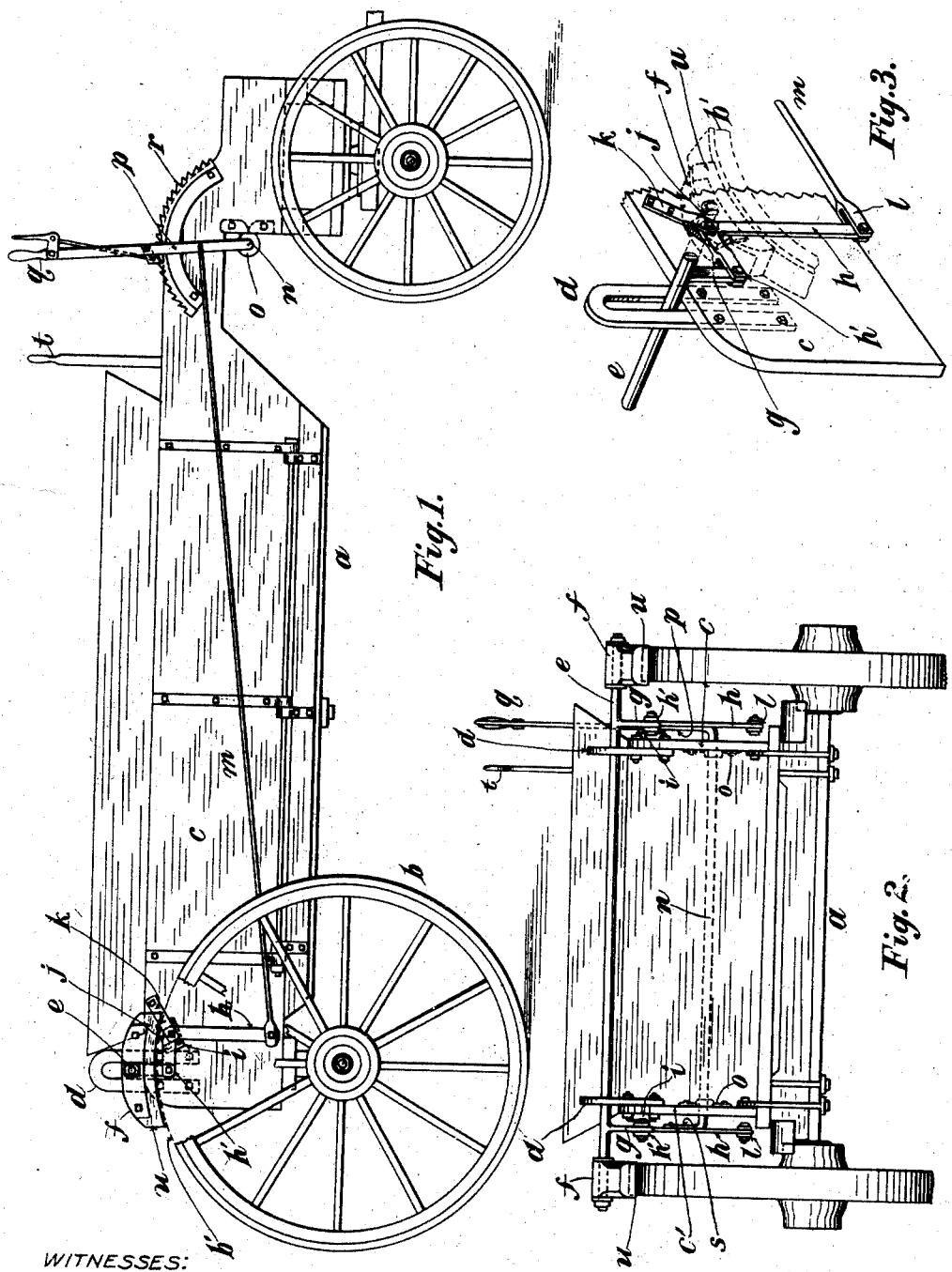
WITNESSES:
A. D. Gerking
Cecil Long
INVENTOR:
Luther Boucher
by T. J. Geisler
ATT'Y.

UNITED STATES PATENT OFFICE.

LUTHER BOUCHER, OF PORTLAND, OREGON, ASSIGNOR TO MITCHELL, LEWIS & STAVER CO., OF PORTLAND, OREGON.

WHEEL-BRAKE FOR DUMP-WAGONS.

No. 927,322.  Specification of Letters Patent.  Patented July 6, 1909.

Application filed August 3, 1907. Serial No. 386,999.

*To all whom it may concern:*

Be it known that I, LUTHER BOUCHER, a citizen of the United States, and a resident of Portland, county of Multnomah, and State of Oregon, have invented a new and useful Improvement in Wheel-Brakes for Dump-Wagons, of which the following is a specification, reference being had to the accompanying drawings as constituting a part thereof.

This invention has for its object to provide an inexpensive but efficient brake for the hind wheels of vehicles of the dump-wagon type, and to so arrange the braking device that the brake-shoes may be simultaneously and evenly applied with effective force upon the rims of the hind wheels and relieved again by the mere movement of a hand lever located near the driver's seat.

To this end my invention comprises the devices and combinations of parts hereinafter set forth.

In such drawings, Figure 1 shows a side elevation of a dump wagon with my braking mechanism applied thereto; the upper part of the near hind-wheel being broken away so as to more clearly show the brake device; Fig. 2 is a rear end view of the wagon, shown in Fig. 1; and Fig. 3 is a partial perspective, showing the rear-end of one wagon-side, and a detail of the means provided for applying and releasing the brake-shoe; the latter and the section of the wheel-rim thereunder being shown in broken outline.

Referring now to the letters on the drawings: The wagon-body $a$ is constructed in accordance with the usual dump-wagon type. Affixed on the inner faces of the wagon-sides $c, c'$, slightly rearward of the axles of the hind-wheels $b$, are U-shaped guide-irons $d, d$, serving as supports for, and allowing vertical movement of the transversely arranged brake rod $e$, carrying at its extremities brake shoes $f, f$. The bar $e$ is made on its projecting ends with pendent integral vertical arms $g$, located between the wagon sides, and said brake-shoes and said arms $g$ are pivotally fastened to the forked upper-ends $h'$ of bell-cranks $h$ (the parts being duplicated on both sides of the wagon), which are pivoted in place on blocks $i$, by bolts $j$, inserted through the lower ends of the straps $k$, bolted to the sides $c, c'$. The bell-cranks $h$ consist of short upper horizontal members and longer vertical pendent members; and to said vertical members thereof are pivoted the forked rear-ends of connecting rods $m$, the forward ends of which are connected to the bent-up members or integral right-angle arms $p, s$, formed on the extremities of a rock-shaft $n$, journaled in bearings $o$, and fixed to the front part of the wagon, at the sides. The member or arm $p$ of said rock-shaft $n$ is extended so as to constitute a hand-lever $q$, provided with the usual locking devices, so as to be operated over a ratchet-faced quadrant $r$; while the member or arm $s$ of said rock-shaft $n$ is only of the length required to connect thereto the forward end of the rod $m$, on the far side of the wagon.

The lever $t$ represents a part of the dumping devices.

The shoes $f$ are provided with wear-faces $u$, of any suitable material; and the devices for applying the brake-shoes, as will be observed, are arranged to cause the latter, when applied, to bear on the upper rim sections $b'$.

It is also to be observed that the bell-cranks are so arranged as to exert a strong force by the brake-shoes upon the rim of the wheels without imposing any great stress upon the brake rod $e$, and the latter is relieved of all torsional strain by having an even pull exerted thereon, at both sides, through the medium of the two connecting rods. The brake rod $e$ is held against lateral movement by its connection with the bell-cranks. It is also to be noted that the parts are so arranged as to accommodate any unevenness in the wear of the brake-shoes or other parts, without decreasing the effectiveness of my brake as a whole.

I claim:

A brake for vehicles of the dump-wagon type comprising, in combination with the wagon-body and the hind wheels, of guide wagon-body, slightly rearward of the axis of the hind wheels, a transverse brake rod vertically movable in and having ends projecting beyond said guide irons, brake-shoes on the extremities of said brake rod, rigid pendent arms on the extremities of said brake rod between the brake shoes and the sides of the wagon body, bearings affixed to the exterior of the sides of the wagon-body, bell-cranks pivoted in said bearings and consisting of short horizontal members and longer vertical members, the former connected with said pendent arms of the brake rod, a rock-shaft journaled transversely at the front end of the wagon-body, rigid upwardly
5 projecting arms on the extremities of said rock-shaft, rods connecting said arms with the longer vertical members of said bell- cranks, one of said arms of the rock-shaft being adapted to constitute a hand-lever, and means for locking the latter in place.

LUTHER BOUCHER.

Witnesses:
CECIL LONG,
A. D. GERKING.